Jan. 11, 1927.

G. E. RANDALL 1,614,390

EDUCATIONAL DEVICE

Filed May 3, 1924

INVENTOR
Gertrude E. Randall
BY
Pierre Barnes
ATTORNEY

Patented Jan. 11, 1927.

1,614,390

UNITED STATES PATENT OFFICE.

GERTRUDE E. RANDALL, OF SEATTLE, WASHINGTON.

EDUCATIONAL DEVICE.

Application filed May 3, 1924. Serial No. 710,785.

This invention relates to educational devices for use more especially in training a typewriting student to readily understand the principles of the art and the arrangement of a typewriter keyboard before attempting to use the machine.

The object of the invention is the provision of a simple, inexpensive and convenient device for effecting the purposes above mentioned.

A further object is to provide means to assist a teacher with a saving of time in instructing a class in typewriting, particularly with regard to the relative locations of keyboard elements to promote accuracy and speed.

The invention consists in the novel construction, adaptation and combination of the several parts of the devices as hereinafter described and claimed.

In the accompanying drawing,—

Figure 1:
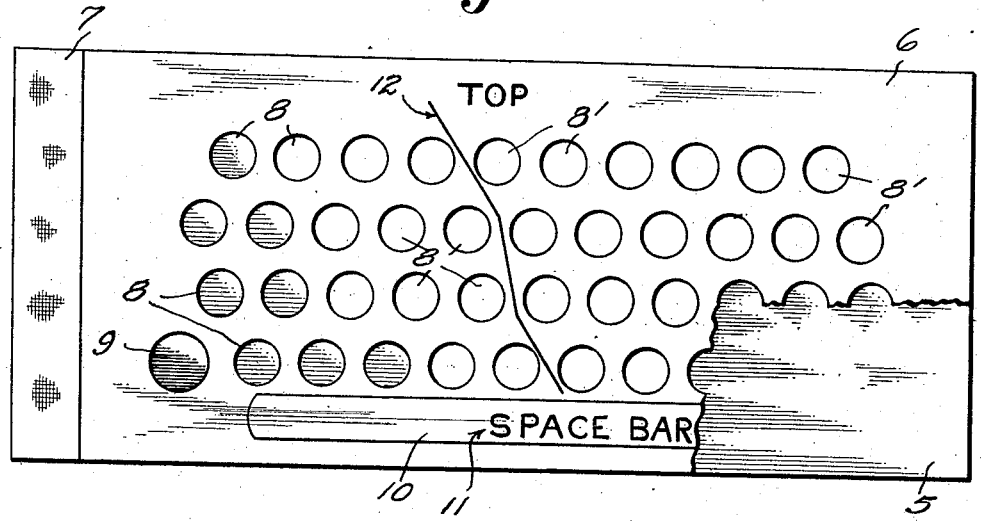
Figure 2:
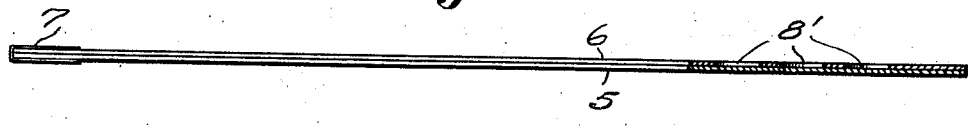
Figure 3:
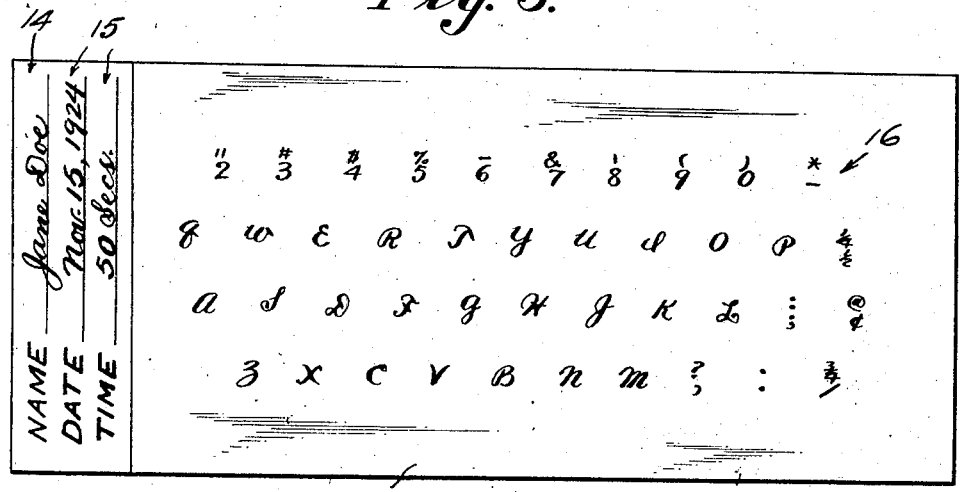

Figure 1 is a plan view of my improved device with the upper leaf thereof partly broken away. Fig. 2 is a longitudinal elevational view of the same, partly in section. Fig. 3 is a plan view of an exercise sheet.

The device comprises a lower leaf or bottom member 5 and upper leaf or cover member 6 of similar oblong shape and connected together at one side of each, preferably the left hand side, by means of a backing strip 7 of flexible material so that the device is openable like a book.

The length and width of the device are somewhat greater than the corresponding dimensions of the standard typewriter keyboard.

The bottom member 5 is imperforate and the cover member 6, hereinafter designated as the chart, is provided with apertures 8, 8¹ and 9, of a number corresponding to character keys and shift keys, respectively, of a typewriter keyboard and arranged in substantially the same relations as the respective keys of the machine, although in this instance the various apertures are disposed in a plane instead of in a bank of rows. Printed or otherwise marked upon the lower portion of the chart 6 is an oblong representation 10 of a bar upon which is advantageously printed the words Space Bar indicated by 11. 12 indicates a guide line provided upon the chart as shown, which serves to separate the key indicating apertures 8 pertaining to the left hand of the student from those indicated by 8¹ for his right hand.

In Fig. 3, I illustrate a practice sheet denoted by 13 of approximately the size of said chart and at one end thereof are spaces such as 14 and 15 in which the name and record of the student may be written.

For use, the student first familiarizes himself with the keyboard by memorizing the characters thereof and utilizing the various apertures 8—8¹ of the chart for locating the respective characters and 9 for shifting exercises.

After the fingering is learned under the direction of the teacher, the practice sheet is employed in the device between the bottom and chart members thereof for the student to write upon.

Exercises may be filled in upon the practice sheet through the chart apertures as directed by the instructor as, for example, all of the characters—letters, figures, etc.,— denoted by 16 in Fig. 3. The student is kept at such writing tests until by practice he can produce from memory all of the characters through the chart apertures in about thirty seconds of time.

After the student has completed tests and exercises as above explained to the satisfaction of the teacher, the device may be discarded and actual practice begun upon a typewriting machine.

The present invention affords convenient, speedy and accurate means for learning the use of a typewriter keyboard.

What I claim is,—

1. In an educational device, a plane member formed to provide a chart indicative of an entire typewriter keyboard wherein the keys thereof respectively are represented by apertures, said member being adapted to be employed upon a sheet of exercise paper, the apertures of the member permitting a student to mark characters upon the paper indicative of the respective apertures.

2. In an educational device, the combination of a bottom member and cover member, said cover member being provided with series of spaced apertures representing in number and location the respective keys of a typewriter keyboard, and a means for coupling said members together, of a practice sheet adapted to be employed between said members.

Signed at Seattle, Washington, this 28th day of March, 1924.

GERTRUDE E. RANDALL.